United States Patent
Assarsson et al.

(10) Patent No.: US 11,725,570 B2
(45) Date of Patent: Aug. 15, 2023

(54) ENGINE PISTON, ENGINE, HAND-HELD TOOL, AND METHOD OF MANUFACTURING AN ENGINE PISTON

(71) Applicant: HUSQVARNA AB, Huskvarna (SE)

(72) Inventors: Henrik Assarsson, Jönköping (SE); Johan Lönn, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/435,791

(22) PCT Filed: Mar. 2, 2020

(86) PCT No.: PCT/SE2020/050228
§ 371 (c)(1),
(2) Date: Sep. 2, 2021

(87) PCT Pub. No.: WO2020/180232
PCT Pub. Date: Sep. 10, 2020

(65) Prior Publication Data
US 2022/0049642 A1 Feb. 17, 2022

(30) Foreign Application Priority Data

Mar. 6, 2019 (SE) .................................... 1950283-0

(51) Int. Cl.
*F02B 17/00* (2006.01)
*F02B 25/22* (2006.01)
(Continued)

(52) U.S. Cl.
CPC ............ *F02B 17/005* (2013.01); *F02B 25/22* (2013.01); *F02B 33/04* (2013.01); *F02B 63/02* (2013.01);
(Continued)

(58) Field of Classification Search
CPC ........ F02B 17/00; F02B 17/005; F02B 25/22; F02B 33/04; F02B 63/02; F02B 2075/025;
(Continued)

(56) References Cited

U.S. PATENT DOCUMENTS

| 1,646,998 A | 10/1927 | F.P, Jr. |
| 5,979,391 A | 11/1999 | Ulrich et al. |

(Continued)

FOREIGN PATENT DOCUMENTS

| DE | 3812479 A1 | 10/1989 |
| EP | 0392550 B1 | 12/1996 |

(Continued)

OTHER PUBLICATIONS

International Search Report and Written Opinion for International Application No. PCT/SE2020/050228 dated May 29, 2020.
(Continued)

*Primary Examiner* — Grant Moubry
*Assistant Examiner* — James G Moubry
(74) *Attorney, Agent, or Firm* — Burr & Forman LLP

(57) ABSTRACT

A two-stroke engine piston (1) is disclosed comprising a piston top (3), a mantle surface (5), a stratified scavenging channel (7) in the mantle surface (5), and a weight reduction space (9) arranged between the piston top (3) and the stratified scavenging channel (7). The weight reduction space (9) has a largest first axial extent (a1) at the mantle surface (5) and a second axial extent (a2) radially inside the mantle surface (5), and wherein the second axial extent (a2) is greater than the largest first axial extent (a1). The present disclosure further relates to an engine (30), a hand-held tool (40), and a method of manufacturing an engine piston (1).

19 Claims, 4 Drawing Sheets

(51) Int. Cl.
*F02B 33/04* (2006.01)
*F02B 63/02* (2006.01)
*F02F 3/00* (2006.01)
*F02F 3/24* (2006.01)
*F16J 1/09* (2006.01)
*F02B 75/02* (2006.01)

(52) U.S. Cl.
CPC .............. *F02F 3/0076* (2013.01); *F02F 3/24* (2013.01); *F16J 1/09* (2013.01); *F02B 2075/025* (2013.01); *F02F 2003/0007* (2013.01)

(58) Field of Classification Search
CPC .... F02F 3/0076; F02F 3/24; F02F 2003/0007; F16J 1/09
See application file for complete search history.

(56) References Cited

U.S. PATENT DOCUMENTS

| | | | |
|---|---|---|---|
| 6,546,993 | B1 | 4/2003 | Filch |
| 6,895,910 | B2 | 5/2005 | Geyer et al. |
| 6,945,203 | B2 | 9/2005 | Amend et al. |
| 10,344,707 | B2 * | 7/2019 | Loew ................... F02F 3/0076 |
| 2003/0140874 | A1 | 7/2003 | Zama et al. |
| 2003/0217711 | A1 | 11/2003 | Geyer et al. |
| 2005/0045124 | A1 * | 3/2005 | Amend ................... F02F 1/22 |
| | | | 123/73 AA |
| 2006/0037471 | A1 | 2/2006 | Zhu et al. |
| 2006/0118076 | A1 | 6/2006 | Schnaitmann |
| 2007/0113734 | A1 * | 5/2007 | Haussermann ......... B23P 15/10 |
| | | | 92/208 |
| 2009/0151688 | A1 | 6/2009 | Matsui et al. |
| 2010/0147252 | A1 | 6/2010 | Langner et al. |
| 2011/0162630 | A1 | 7/2011 | Takayanagi |
| 2011/0197868 | A1 | 8/2011 | Engel |
| 2018/0051650 | A1 | 2/2018 | Loew et al. |
| 2022/0049642 | A1 * | 2/2022 | Assarsson ............... F02B 63/02 |

FOREIGN PATENT DOCUMENTS

| | | |
|---|---|---|
| EP | 3284938 A1 | 2/2018 |
| JP | H09100912 A | 4/1997 |
| JP | 2000097105 A | 4/2000 |
| JP | 2000213414 A | 8/2000 |
| JP | 2003343348 A | 12/2003 |
| WO | 2006014741 A2 | 2/2006 |
| WO | 2015038420 A2 | 3/2015 |

OTHER PUBLICATIONS

Swedish Search Report & OA for Application No. 1950283-0 dated Aug. 28, 2019.

* cited by examiner

# ENGINE PISTON, ENGINE, HAND-HELD TOOL, AND METHOD OF MANUFACTURING AN ENGINE PISTON

TECHNICAL FIELD

The present disclosure relates to a two-stroke engine piston comprising a weight reduction space. The present disclosure further relates to a two-stroke engine comprising a piston, a hand-held tool comprising a two-stroke engine, as well as a method of manufacturing an engine piston.

BACKGROUND

A two-stroke engine is a type of internal combustion engine which completes a power cycle with two strokes of the piston during only one crankshaft revolution. The uppermost position of a piston in a cylinder is usually referred to as the top dead centre and the lowermost position of the piston in the cylinder is usually referred to as the bottom dead centre. Compared to four-stroke engines, two-stroke engines have a greatly reduced number of moving parts, and consequently can be made more compact and significantly lighter. Therefore, two-stroke petrol engines are used in applications where mechanical simplicity, light weight, and high power-to-weight ratio are main concerns. Typical applications are hand-held tools such as chainsaws.

Most small sized two-stroke engines are crankcase-scavenged engines meaning that these engines use the area below the piston as a charging pump to build up pressure in the crank case during the power stroke of the piston. Some of these engines are provided with a fuel supply device, such as a carburetor, arranged to supply an air/fuel mixture to the crankcase. In the power stroke of a two-stroke engine, the increased pressure and temperature in the cylinder obtained by the combustion of fuel is partially converted into mechanical work supplied to a crankshaft of the engine. At the same time, the pressure in the crankcase increases as a result of the movement of the piston towards the bottom dead centre. An exhaust port arranged in the cylinder wall is opened to allow exhaust gases to flow out from the cylinder when the piston reaches a first position relative the cylinder in its movement towards the bottom dead centre. The piston continues the movement towards the bottom dead centre and when it reaches a second position, below the first position, an inlet port arranged in the cylinder wall is opened. The inlet port is fluidly connected to the crankcase via a transfer duct. The air/fuel mixture in the crank case is forced to flow into the cylinder via the inlet port by the overpressure in the crankcase.

Accordingly, as understood from the above, in this type of engine, the exhaust port, and the inlet port in the cylinder are open simultaneously in the scavenging phase of the engine, i.e. when the piston is in the region of a bottom dead centre. As a result thereof, some air/fuel mixture may flow through the cylinder from the inlet port to the exhaust port in the scavenging phase. Therefore, a problem associated with small sized two-stroke engines is emission of unburned hydrocarbon, i.e. unburned fuel. A way to counter this problem is to provide the engine with a stratified scavenging arrangement.

In such engines, the piston can be provided with a stratified scavenging channel arranged to superimpose the transfer duct and an air channel in the cylinder wall when the piston is in a region of the top dead centre. When the piston is in this position, clean air, i.e. air without added fuel, can flow from the air channel into the transfer duct. As a result thereof, when the piston reaches the second position, referred to above, in which the inlet port is opened, clean air will first enter the cylinder before the air/fuel mixture further down in the transfer duct reaches the cylinder. In this manner, less fuel will flow out through the exhaust port in the scavenging phase and the emission of unburned hydrocarbon can thereby be significantly reduced.

However, a drawback with a stratified scavenging channel in a piston is that it adds weight to the piston since it requires channel walls in the piston. The weight of the piston of an engine is an important aspect and an increased weight of a piston leads to several drawbacks. For example, a piston having a higher weight increases vibrations caused by the movement of the piston. Thereby, an engine comprising the piston will vibrate more and may require counterweights on the crankshaft having higher weight as well as bearings being larger and having higher weight. Accordingly, such an engine may increase weight of a hand-held tool and may cause it to vibrate more during use. As understood from the above, many advantages can be obtained by reducing the weight of a piston of an engine. However, also numerous challenges exist when trying to reduce the weight of a piston, partly because the piston needs a certain structural strength and rigidity to withstand the high temperatures, forces, and pressures it is subjected to during operation in an engine. Moreover, the reduction of the weight of a piston may be problematic due to structures and geometries of the piston, which are needed.

SUMMARY

It is an object of the present invention to overcome, or at least alleviate, at least some of the above-mentioned problems and drawbacks.

According to a first aspect of the invention, the object is achieved by a two-stroke engine piston comprising a piston top, a mantle surface, a stratified scavenging channel in the mantle surface, and a weight reduction space arranged between the piston top and the stratified scavenging channel. The weight reduction space has a largest first axial extent at the mantle surface and a second axial extent radially inside the mantle surface, wherein the second axial extent is greater than the largest first axial extent.

Since the second axial extent is greater than the largest first axial extent, conditions are provided for a structurally strong and rigid piston, while conditions are provided for a significant reduction of the weight of the piston. This because the relatively smaller first axial extent of the weight reduction space at the mantle surface will not significantly impair the structural strength and rigidity of the piston while the relatively greater second axial extent of the weight reduction space, radially inside the mantle surface, can provide a significant weight reduction of the piston. The relatively smaller first axial extent of the weight reduction space at the mantle surface will not significantly impair the structural strength and rigidity of the piston because the mantle surface of the piston is more important for the structural strength and rigidity of the piston than material radially inside the mantle surface.

Moreover, the mantle surface of a piston has a number of engine related functions such as providing a seal, conducting heat, and stabilizing the piston relative a cylinder of an engine upon movement of the piston along the cylinder. Thus, since the second axial extent is greater than the largest first axial extent, conditions are provided for a significant reduction of the weight of the piston while the engine related functions of the mantle surface are not significantly impaired.

Moreover, since conditions are provided for a significant weight reduction of the piston, conditions are also provided for a combustion engine having a significantly reduced weight and reduced vibrations during operation.

Furthermore, since the piston comprises the stratified scavenging channel, conditions are provided for low emissions of hydrocarbons when the piston is used in a two-stroke engine. In addition, due to the weight reduction space, a low weight piston can be provided despite the fact that the piston comprises a stratified scavenging channel adding weight to the piston.

Accordingly, a piston is provided overcoming, or at least alleviating, at least some of the above-mentioned problems and drawbacks. As a result, the above-mentioned object is achieved.

Optionally, the second axial extent is at least 10% greater, or at least 40% greater, than the largest first axial extent. Thereby, conditions are provided for a structurally strong and rigid piston, while conditions are provided for a significant reduction of the weight of the piston.

Optionally, the second axial extent is at least 80% greater, or at least 100% greater, than the largest first axial extent. Thereby, conditions are provided for a structurally strong and rigid piston, while conditions are provided for a significant reduction of the weight of the piston.

Optionally, the weight reduction space comprises a first uppermost delimiting surface at the mantle surface and a second upper delimiting surface radially inside the mantle surface, and wherein the second upper delimiting surface is arranged closer to the piston top than the first uppermost delimiting surface. Thereby, conditions are provided for a structurally strong and rigid piston, while conditions are provided for a significant reduction of the weight of the piston. This because the relatively greater axial distance between the first uppermost delimiting surface at the mantle surface and the piston top ensures a structurally strong and rigid piston, while the relatively smaller axial distance between the second upper delimiting surface and the piston top provides conditions for a significant reduction of the weight of the piston.

Optionally, the piston comprises a first piston ring recess in the mantle surface, and wherein the weight reduction space extends radially inside the first piston ring recess. Thereby, conditions are provided for a further weight reduction of the piston, while the structural strength and rigidity is not significantly impaired. This because the material radially inside a piston ring recess has a low impact on the structural strength and rigidity of a piston. Moreover, conditions are provided for a significant reduction of the weight of the piston while engine related functions of the mantle surface are not significantly impaired.

Optionally, the piston comprises a second piston ring recess in the mantle surface, and wherein the weight reduction space extends radially inside the second piston ring recess. Thereby, conditions are provided for a further weight reduction of the piston, while engine related functions and the structural strength and rigidity of the piston are not significantly impaired. Moreover, since the piston according to these embodiments comprises two piston ring recesses, a piston is provided having conditions for obtaining an improved seal between the piston and a cylinder wall.

Optionally, the weight reduction space comprises a first lowermost delimiting surface at the mantle surface and a second lower delimiting surface radially inside the mantle surface, and wherein the second lower delimiting surface is arranged further from the piston top than the first lowermost delimiting surface. Thereby, conditions are provided for a structurally strong and rigid piston, while conditions are provided for a significant reduction of the weight of the piston. This because the relatively greater axial distance between the second lower delimiting surface and the piston top provides conditions for a significant reduction of the weight of the piston, while the relatively smaller axial distance between the first lowermost delimiting surface at the mantle and the piston top ensures a structurally strong and rigid piston.

Optionally, the weight reduction space extends radially inside the stratified scavenging channel. Thereby, conditions are provided for a further weight reduction of the piston despite the fact that the piston comprises a stratified scavenging channel which adds weight to the piston.

Optionally, for a generally circular-cylindrical piston, the radial extent of the weight reduction space is at least 15%, or at least 35%, of the radius of the piston. Thereby, a significant weight reduction of the piston can be ensured.

Optionally, the weight reduction space has a largest first tangential extent at the mantle surface, and a second tangential extent radially inside the mantle surface, and wherein the second tangential extent is greater than the largest first tangential extent. Thereby, conditions are provided for a structurally strong and rigid piston, while conditions are provided for a further reduction of the weight of the piston. This because the material at the mantle surface of a piston is more important for the structural strength and rigidity of the piston than the material radially inside the mantle surface. Moreover, conditions are provided for a significant reduction of the weight of the piston while engine related functions of the mantle surface are not significantly impaired.

Optionally, the second tangential extent is at least 5% greater, or at least 10% greater, than the largest first tangential extent. Thereby, a significant weight reduction of the piston can be ensured while engine related functions and the structural strength and rigidity of the piston are not significantly impaired.

Optionally, the weight reduction space is configured to be isolated from interconnecting any gas transferring channels during operation of an engine comprising the piston. Thereby, a piston is provided in which the sole purpose of the weight reduction space is to reduce weight of the piston. Accordingly, a piston is provided in which the weight reduction space will not participate in the connection between any gas transferring channels. Still optionally, the weight reduction space may be configured to be isolated from any gas transferring channels during operation of an engine comprising the piston.

Optionally, the piston comprises a second stratified scavenging channel in the mantle surface, and a second weight reduction space arranged between the piston top and the second stratified scavenging channel. Thereby, conditions are provided for a piston having a low weight despite the fact that the piston comprises two stratified scavenging channels each adding weight to the piston.

The second weight reduction space may have a largest first axial extent at the mantle surface and a second axial extent radially inside the mantle surface, wherein the second axial extent is greater than the largest first axial extent, in accordance with any of the embodiments of the weight reduction space defined hereinabove.

Optionally, the weight reduction space is arranged on a first side of a plane extending along a centre axis of the piston, and wherein the second weight reduction space is arranged on a second side of the plane. Thereby, conditions are provided for a structurally strong and rigid piston, while conditions are provided for a further weight reduction of the piston.

Optionally, the second weight reduction space has a substantially identical but mirrored shape as the weight reduction space. Thereby, conditions are provided for a structurally strong and rigid piston, while conditions are provided for a further weight reduction of the piston.

According to a second aspect of the invention, the object is achieved by a two-stroke engine comprising a piston according to some embodiments of the present disclosure.

Thereby, conditions are provided for a low weight two-stroke engine producing a low amount of vibrations and hydrocarbons during use. This because the engine comprises a piston having conditions for a significant reduction of the weight thereof, and because the piston comprises a stratified scavenging channel.

Accordingly, a two-stroke engine is provided overcoming, or at least alleviating, at least some of the above-mentioned problems and drawbacks. As a result, the above-mentioned object is achieved.

According to a third aspect of the invention, the object is achieved by a hand-held tool comprising a two-stroke engine according to some embodiments of the present disclosure.

Thereby, conditions are provided for a hand-held tool having a low weight while producing a low amount of vibrations and hydrocarbons during use. This because the engine comprises a piston having conditions for a significant reduction of the weight thereof, and because the piston comprises a stratified scavenging channel.

Accordingly, a hand-held tool is provided overcoming, or at least alleviating, at least some of the above-mentioned problems and drawbacks. As a result, the above-mentioned object is achieved.

According to a fourth aspect of the invention, the object is achieved by a method of manufacturing a two-stroke engine piston comprising the steps of:

providing a mould having a cavity arranged such that a piston casted in the cavity receives a piston top, a mantle surface, and a stratified scavenging channel in the mantle surface, and arranging a core in the cavity such that an outer surface of the core defines an inner surface of a weight reduction space of the piston, and such that the weight reduction space is arranged between the piston top and the stratified scavenging channel and receives a largest first axial extent at the mantle surface and a second axial extent radially inside the mantle surface, wherein the second axial extent is greater than the largest first axial extent.

Since the method comprises the step of arranging the core such that the second axial extent becomes greater than the largest first axial extent, the method provides conditions for obtaining a significant reduction of the weight of a piston, while the structural strength and rigidity of the piston is not significantly impaired. This because the relatively smaller first axial extent of the weight reduction space at the mantle surface will not significantly impair the structural strength and rigidity of the piston while the relatively greater second axial extent of the weight reduction space radially inside the mantle surface can provide a significant weight reduction of the piston. The relatively smaller first axial extent of the weight reduction space at the mantle surface will not significantly impair the structural strength and rigidity of the piston because the mantle surface of the piston is more important for the structural strength and rigidity of the piston than material radially inside the mantle surface.

Moreover, the mantle surface of a piston has a number of engine related functions such as providing a seal, conducting heat, and stabilizing the piston relative a cylinder of an engine upon movement of the piston along the cylinder. Thus, since the method comprises the step of arranging the core such that the second axial extent becomes greater than the largest first axial extent, the method provides conditions for obtaining a significant reduction of the weight of the piston while the engine related functions of the mantle surface are not significantly impaired.

Furthermore, since the method comprises the step of providing a mould having a cavity arranged such that a piston casted in the cavity receives a stratified scavenging channel, conditions are provided for low emissions of hydrocarbons when the piston is used in a two-stroke engine. In addition, a method is provided capable of providing a low weight piston despite the fact that the piston comprises a stratified scavenging channel.

Accordingly, a method is provided overcoming, or at least alleviating, at least some of the above-mentioned problems and drawbacks. As a result, the above-mentioned object is achieved.

Optionally, the step of arranging the core comprises the step of:

arranging the core of a different material than the mould.

Thereby, conditions are provided for arranging the core of a material being simple to remove after casting a piston in the mould. Moreover, conditions are provided for arranging the core of a material allowing more complex geometries of the core, and thus also more complex geometries of the weight reduction space.

Optionally, the step of arranging the core comprises the step of:

arranging the core such that the core becomes a lost core.

Thereby, a core is obtained being simple to remove after casting a piston in the mould, despite the fact that the piston comprises a stratified scavenging channel, and despite the fact that the second axial extent of the weight reduction space is greater than the largest first axial extent.

Optionally, the step of arranging the core comprises the step of:

arranging the core of a porous material.

Thereby, conditions are provided for removing the core in a simple manner after casting a piston in the mould, despite the fact that the piston comprises a stratified scavenging channel, and despite the fact that the second axial extent of the weight reduction space is greater than the largest first axial extent.

Optionally, the step of arranging the core of a porous material comprises the step of arranging the core of sand and/or salt.

Thereby, conditions are provided for removing the core in a simple manner after casting a piston in the mould, despite the fact that the piston comprises a stratified scavenging channel, and despite the fact that the second axial extent of the weight reduction space is greater than the largest first axial extent.

Optionally, the step of arranging the core comprises the step of:

arranging the core using an additive manufacturing method.

Thereby, conditions are provided for obtaining a core having more complex geometries, and thus also for obtaining a weight reduction space having more complex geometries. As a further result thereof, conditions are provided for obtaining a further structurally strong and rigid piston, as well as for obtaining a further weight reduction of the piston.

According to a fifth aspect of the invention, the object is achieved by a method of manufacturing an engine piston comprising the steps of:

providing a mould having a cavity arranged such that a piston casted in the cavity receives a piston top and a mantle surface, and arranging a core in the cavity such that an outer surface of the core defines an inner surface of a weight reduction space of the piston, and such that the weight reduction space receives a largest first axial extent at the mantle surface and a second axial extent radially inside the mantle surface, wherein the second axial extent is greater than the largest first axial extent.

According to these embodiments, the piston manufactured by the method may be another type of engine piston than a two-stroke engine piston, such as a four-stroke piston. Such a piston may for example be configured to be used in a compression ignition engine, such as a diesel engine, or an Otto engine with a spark-ignition device, wherein the Otto engine may be configured to run on gas, petrol, alcohol, similar volatile fuels, or combinations thereof. However, it will be appreciated that the method according to the fifth aspect is combinable with each of the embodiments defined hereinabove with reference to the method according to the fourth aspect.

Since the method comprises the step of arranging the core such that the second axial extent becomes greater than the largest first axial extent, the method provides conditions for a significant reduction of the weight of a piston, while the structural strength and rigidity of the piston is not significantly impaired. This because the relatively smaller first axial extent of the weight reduction space at the mantle surface will not significantly impair the structural strength and rigidity of the piston while the relatively greater second axial extent of the weight reduction space radially inside the mantle surface can provide a significant weight reduction of the piston. The relatively smaller first axial extent of the weight reduction space at the mantle surface will not significantly impair the structural strength and rigidity of the piston because the mantle surface of the piston is more important for the structural strength and rigidity of the piston than material radially inside the mantle surface.

Moreover, the mantle surface of a piston has a number of engine related functions such as providing a seal, conducting heat, and stabilizing the piston relative a cylinder of an engine upon movement of the piston along the cylinder. Thus, since the method comprises the step of arranging the core such that the second axial extent becomes greater than the largest first axial extent, the method provides conditions for obtaining a significant reduction of the weight of the piston while the engine related functions of the mantle surface are not significantly impaired.

Accordingly, a method is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
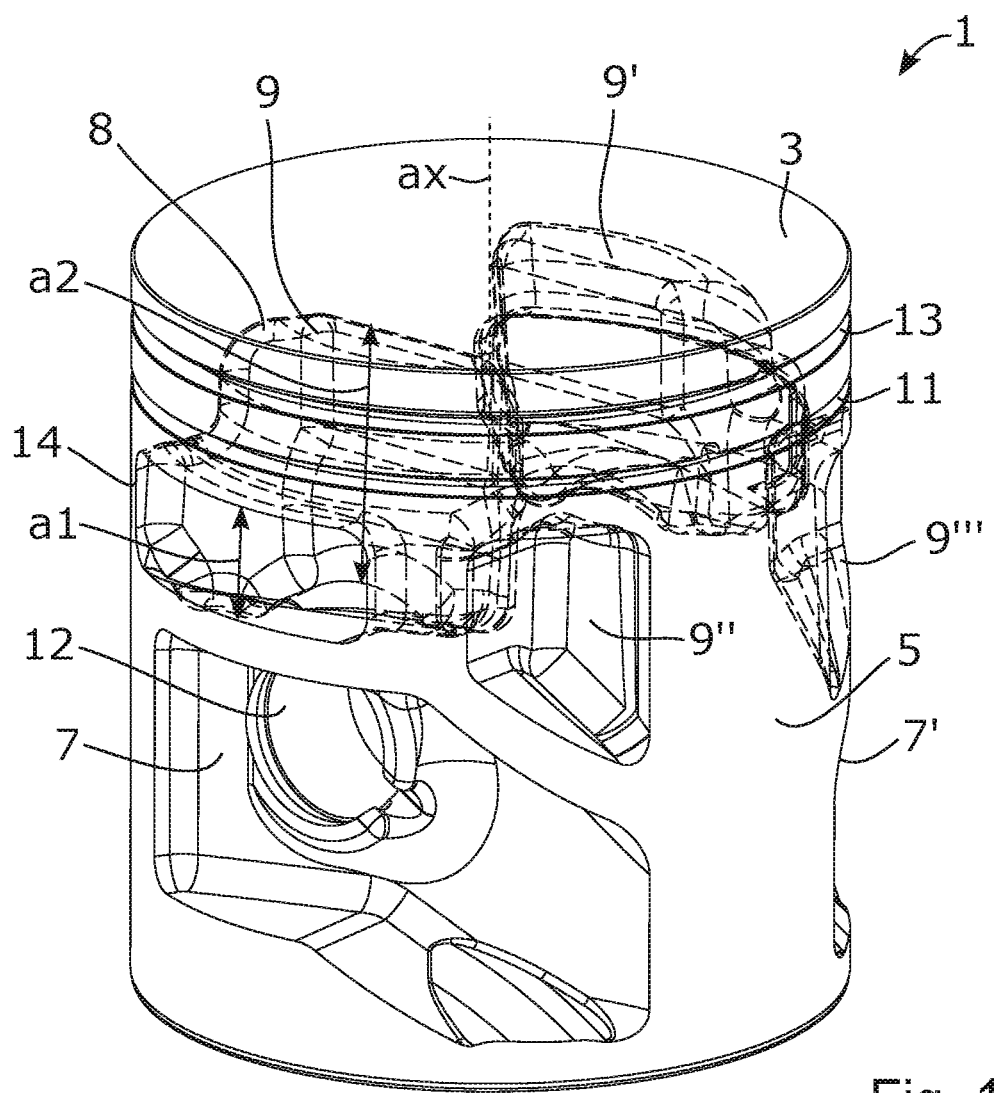
FIG. 1 illustrates a perspective view of a two-stroke engine piston, according to some embodiments.

FIG. 1 illustrates a perspective view of a two-stroke engine piston 1, according to some embodiments. The two-stroke engine piston 1 is in some places herein referred to as "the piston 1" for the reason of brevity and clarity. The piston 1 comprises a piston top 3. The piston top 3 is arranged to face a cylinder head of an engine cylinder of a two-stroke engine when the piston 1 is arranged in the engine cylinder. The piston top 3 is arranged to define a combustion chamber together with a cylinder wall of the engine cylinder. Accordingly, the piston top 3 is arranged to be in contact with hot combustion gases during a power stroke of an engine comprising the piston 1. Moreover, the piston 1 comprises a cylindrically shaped mantle surface 5. The outer diameter of the mantle surface 5 is slightly smaller than an inner diameter of the engine cylinder, and the mantle surface 5 is arranged to face the cylinder walls of the engine cylinder when the piston 1 is arranged therein. A mantle surface 5 of a piston 1 is sometimes referred to as a piston skirt.

The piston 1 comprises a first and a second piston ring recess 11, 13 in the mantle surface 5. Each of the first and second piston ring recesses 11, 13 is arranged to receive a piston ring for providing a seal between the mantle surface 5 of the piston 1 and cylinder walls of the engine cylinder. Moreover, the piston 1 comprises an aperture 12 configured to receive a gudgeon pin for connecting the piston 1 to a connecting rod of the engine.

The piston 1 further comprises a stratified scavenging channel 7 in the mantle surface 5. The stratified scavenging channel 7 is arranged to superimpose a transfer duct and an air channel in a cylinder wall of an engine when the piston 1 is in a certain position relative the engine cylinder. When the piston 1 is in this position, clean air, i.e. air without added fuel, can flow from the air channel into the transfer duct via the stratified scavenging channel 7. As a result thereof, the emission of unburned hydrocarbon produced by the engine can be significantly reduced.

As indicated in FIG. 1, the piston 1 further comprises a weight reduction space 9 arranged between the piston top 3 and the stratified scavenging channel 7. According to the illustrated embodiments, the weight reduction space 9 is configured to be isolated from any gas transferring channels during operation of an engine comprising the piston 1 and is not assigned any gas transferring task during operation of the engine. The weight reduction space 9 extends through the mantle surface 5 of the piston 1 and has an opening 14 in the mantle surface 5. According to the illustrated embodiments, the opening 14 of the weight reduction space 9 is the only opening of the weight reduction space 9. In FIG. 1, portions of delimiting surfaces of the weight reduction space 9 radially inside the mantle surface 5, which are not visible through the opening 14, are illustrated in dashed lines. The weight reduction space 9 has a largest first axial extent a1 at the mantle surface 5. The term "largest first axial extent a1" is herein intended to encompass the largest extent a1 of the weight reduction space 9 measured between two delimiting surfaces of the weight reduction space 9 at the mantle surface 5, i.e. at the opening 14, in a direction parallel to a centre axis ax of the piston 1. The centre axis ax of the piston 1 coincides with moving directions of the piston 1 during operation of the piston 1 in an engine. Moreover, the centre axis ax of the piston 1 also coincides with a centre axis ax of the cylindrically shaped mantle surface 5.

Moreover, according to the present disclosure, the weight reduction space 9 has a second axial extent a2 radially inside the mantle surface 5. As can be seen in FIG. 1, the second axial extent a2 is greater than the largest first axial extent a1. The term "second axial extent a2" is herein intended to encompass an extent a2 of the weight reduction space 9 measured between two delimiting surfaces of the weight reduction space 9 radially inside of the mantle surface 5 in a direction parallel to a centre axis ax of the piston 1. According to some embodiments of the present disclosure, the second axial extent a2 is measured radially inside of the first axial extent a1. That is, according to such embodiments, the first axial extent a1 and the second axial extent a2 are measured in the same plane, wherein the plane extends along the centre axis ax of the piston 1.

As is further explained herein, since the second axial extent a2 is greater than the largest first axial extent a1, conditions are provided for a structurally strong and rigid piston 1, while conditions are provided for a significant reduction of the weight of the piston 1. Moreover, the mantle surface 5 of a piston 1 has a number of engine related functions such as providing a seal, conducting heat, and stabilizing the piston 1 relative a cylinder of an engine upon movement of the piston along the cylinder. Thus, since the second axial extent a2 is greater than the largest first axial extent a1, conditions are provided for a significant reduction of the weight of the piston 1 while the engine related functions of the mantle surface 5 are not significantly impaired.

According to the illustrated embodiments, the second axial extent a2 is approximately 128% greater than the largest first axial extent a1. According to further embodiments, the second axial extent a2 may be at least 10% greater, or at least 40% greater, than the largest first axial extent a1. Furthermore, according to some embodiments, the second axial extent a2 may be at least 80% greater, or at least 100% greater, than the largest first axial extent a1.

Figure 2:
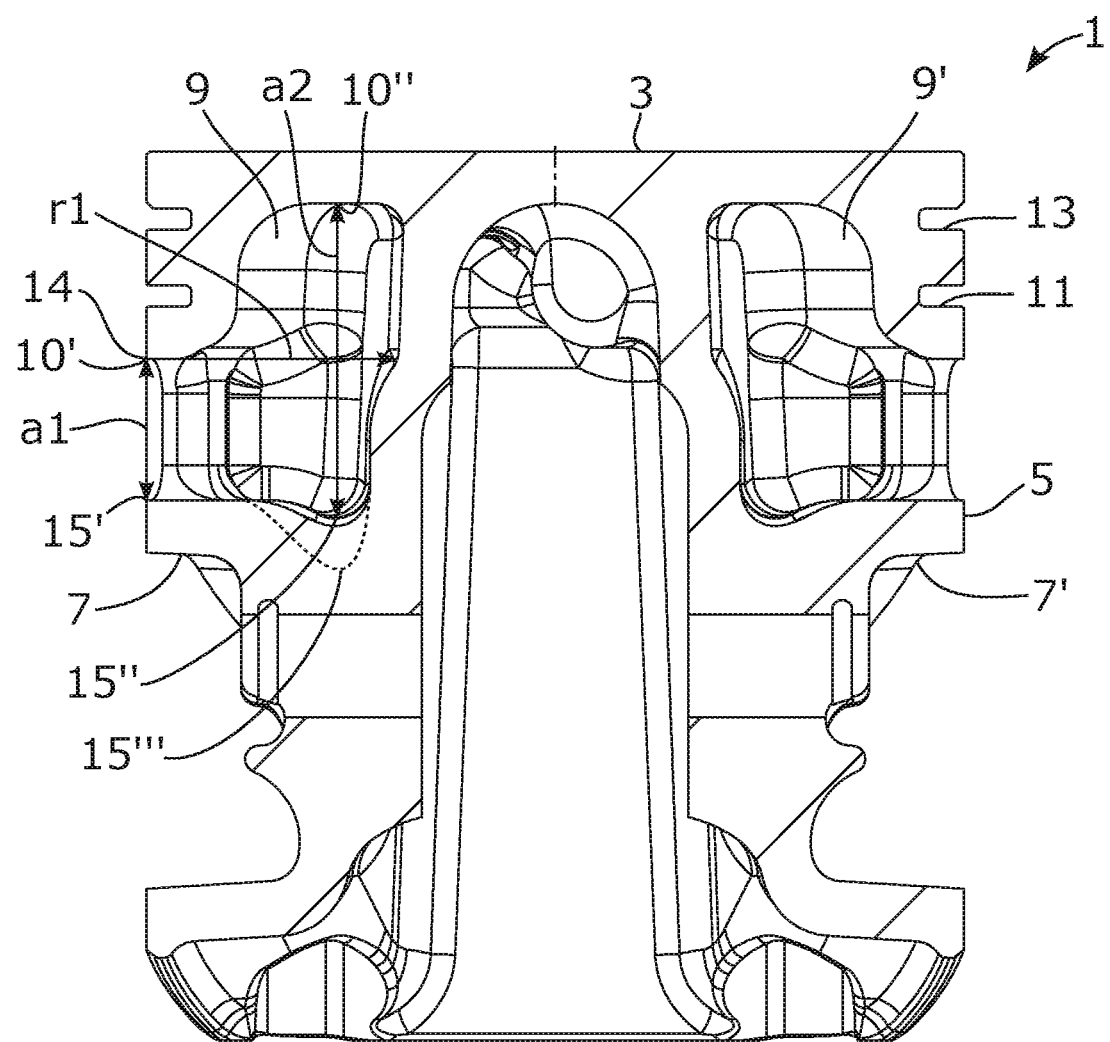
FIG. 2 illustrates a first cross section of the piston illustrated in FIG. 1.

FIG. 2 illustrates a first cross section of the piston 1 illustrated in FIG. 1. The first cross section of FIG. 2 is made in a plane parallel to the centre axis of the piston 1 at a location offset from the centre axis. As indicated in FIG. 2, the weight reduction space 9 comprises a first uppermost delimiting surface 10' at the mantle surface 5. The term "first uppermost delimiting surface 10'" is herein intended to encompass a delimiting surface 10' of the weight reduction space 9 at the mantle surface 5, i.e. at the opening 14, being closest to the piston top 3 measured in a direction parallel to a centre axis ax of the piston 1. Moreover, the weight reduction space 9 comprises a second upper delimiting surface 10" radially inside the mantle surface 5. As seen in FIG. 2, the second upper delimiting surface 10" is arranged closer to the piston top 3 than the first uppermost delimiting surface 10'. In this manner, conditions are provided for a structurally strong and rigid piston 1, while conditions are provided for a significant reduction of the weight of the piston 1.

The second upper delimiting surface 10" may be the uppermost delimiting surface 10" of the weight reduction space 9 radially inside of the mantle surface 5, as is the case according to the illustrated embodiments, i.e. the delimiting surface 10" of the weight reduction space 9 radially inside of the mantle surface 5 being closest to the piston top 3 measured in a direction parallel to a centre axis ax of the piston 1. In cases where the piston 1 comprises a flat piston top 3, the surface normal of the first uppermost delimiting surface 10' and the surface normal of the second upper delimiting surface 10" each points in a direction opposite to the surface normal of the piston top. Moreover, the surface normal of the first uppermost delimiting surface 10' and the surface normal of the second upper delimiting surface 10" each points in a direction coinciding with a movement direction of the piston 1 when the piston 1 is installed in an engine and moves in a direction towards the bottom dead centre. However, clearly, it will be appreciated that the teachings herein are applicable also to pistons having a non-flat piston top.

In FIG. 1 and FIG. 2, the first and second piston ring recesses 11, 13 are indicated. As best seen in FIG. 2, the weight reduction space 9 extends radially inside the first piston ring recess 11 as well as extends radially inside the second piston ring recess 13. Furthermore, the weight reduction space 9 comprises a first lowermost delimiting surface 15' at the mantle surface 5 and a second lower delimiting surface 15" radially inside the mantle surface 5. As seen in FIG. 2, the second lower delimiting surface 15" is arranged further from the piston top 3 than the first lowermost delimiting surface 15'. In this manner, conditions are provided for a structurally strong and rigid piston 1, while conditions are provided for a significant reduction of the weight of the piston 1.

The term "first lowermost delimiting surface 15'" is herein intended to encompass a delimiting surface 15' of the weight reduction space 9 at the mantle surface 5, i.e. at the opening 14, being furthest away from the piston top 3 measured in a direction parallel to a centre axis ax of the piston 1. The second lower delimiting surface 15" may be the lowermost delimiting surface 15" of the weight reduction space 9 radially inside of the mantle surface 5, as is the case according to the illustrated embodiments, i.e. the delimiting surface 15" of the weight reduction space 9 radially inside of the mantle surface 5 being furthest away from the piston top 3 measured in a direction parallel to a centre axis of the piston 1. In cases where the piston 1 comprises a flat piston top 3, the surface normal of the first lowermost delimiting surface 15' and the surface normal second lower delimiting surface 15" each points in a direction of the surface normal of the piston top. Moreover, the surface normal of the first lowermost delimiting surface 15' and the surface normal second lower delimiting surface 15" each points in a direction coinciding with a movement direction of the piston 1 when the piston 1 is installed in an engine and moves in a direction towards the upper dead centre.

According to some embodiments of the present disclosure, the weight reduction space 9 may extend radially inside the stratified scavenging channel 7. The lower delimiting surface 15''' of such a weight reduction space 9 is indicated in a dashed line 15''' in FIG. 2.

According to the illustrated embodiments, the radial extent r1 of the weight reduction space 9 is approximately 57% of the radius of the piston 1. According to further embodiments, the radial extent r1 of the weight reduction space 9 may be at least 15%, or at least 35%, of the radius of the piston 1. The radial extent r1 of the weight reduction space 9 may be measured from the mantle surface 5 to a radially inner delimiting surface of the weight reduction space 9 in a radial direction of the piston 1, i.e. in a direction perpendicular to the centre axis of the piston 1.

Figure 3:
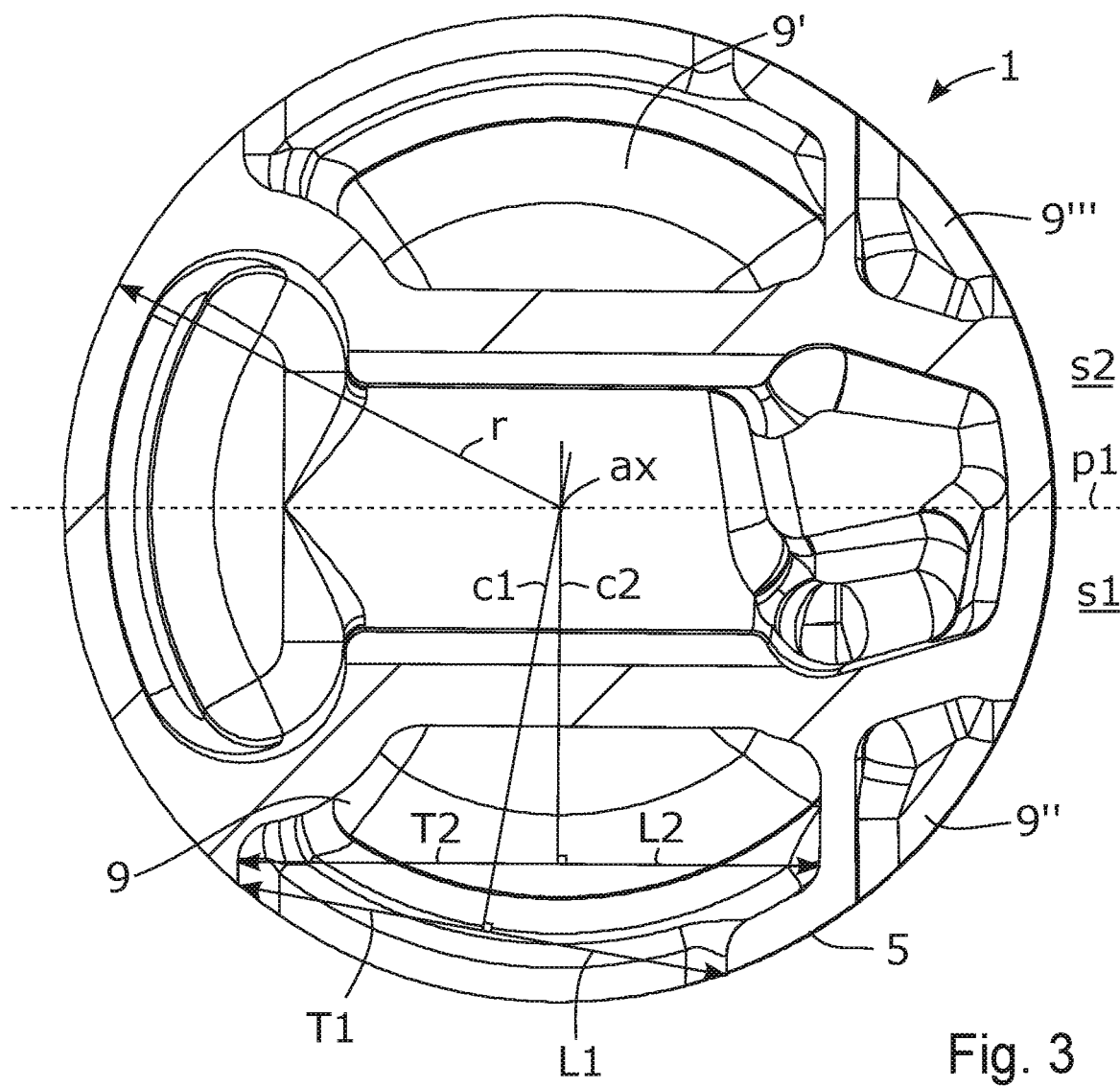
FIG. 3 illustrates a second cross section of the piston illustrated in FIG. 1 and FIG. 2.

FIG. 3 illustrates a second cross section of the piston 1 illustrated in FIG. 1 and FIG. 2. The second cross section of FIG. 3 is made in a plane perpendicular to the centre axis ax of the piston 1. As indicated in FIG. 3, the weight reduction space 9 has a largest first tangential extent T1 at the mantle surface 5, and a second tangential extent T2 radially inside the mantle surface 5, and wherein the second tangential extent T2 is greater than the largest first tangential extent T1. Thereby, conditions are provided for a structurally strong and rigid piston 1, while conditions are provided for a further reduction of the weight of the piston 1. This because the material at the mantle surface 5 of a piston 1 is more important for the structural strength and rigidity of the piston 1 than the material radially inside the mantle surface 5.

The tangential extent T1, T2, as referred to herein, is the distance between two delimiting surfaces of the weight reduction space 9, measured in a plane perpendicular to the centre axis ax of the piston 1 along a measurement line L1, L2 having a centre normal c1, c2 crossing the centre axis ax. According to the illustrated embodiments, the second tangential extent T2 is approximately 18% greater than the largest first tangential extent T1. According to further embodiments, the second tangential extent T2 may be at least 5% greater, or at least 10% greater, than the largest first tangential extent T1.

As indicated in FIG. 1, according to the illustrated embodiments, the piston 1 comprises a second stratified scavenging channel 7' in the mantle surface 5. The second stratified scavenging channel 7' is also arranged to superimpose a transfer duct and an air channel in a cylinder wall of the engine when the piston 1 is in a certain position relative the engine cylinder. That is, when the piston 1 is in this position, clean air, i.e. air without added fuel, can flow from the air channel into the transfer duct also via the second stratified scavenging channel 7'. Moreover, as can be seen in FIG. 1, FIG. 2, and FIG. 3, the piston 1 comprises a second weight reduction space 9' arranged between the piston top 3 and the second stratified scavenging channel 7'. As indicated in FIG. 3, the weight reduction space 9 is arranged on a first side s1 of a plane p1 extending along a centre axis ax of the piston 1, and the second weight reduction space 9' is arranged on a second side s2 of the plane p1, wherein the second side s2 is opposite to the first side s1. The second weight reduction space 9' has a substantially identical but mirrored shape as the weight reduction space 9 and will not be further explained in detail herein.

Moreover, as indicated in FIG. 1 and FIG. 3, the piston 1 comprises a third weight reduction space 9'' and a fourth weight reduction space 9'''. According to the illustrated embodiments, the third weight reduction space 9'' and the fourth weight reduction space 9''' are each arranged between the piston top 3 and a stratified scavenging channel 7, 7' of the piston 1. The third weight reduction space 9'' and the fourth weight reduction space 9''' may each comprise similar or corresponding features as the weight reduction space 9 explained herein.

The piston 1 may be formed in an aluminium alloy. Moreover, as is further explained herein, the piston 1 may be manufactured using a casting manufacturing method. The piston 1 according to the embodiments illustrated in FIG. 1-FIG. 3 is a two-stroke engine piston 1 for a small sized crankcase scavenged two-stroke engine.

Figure 4:
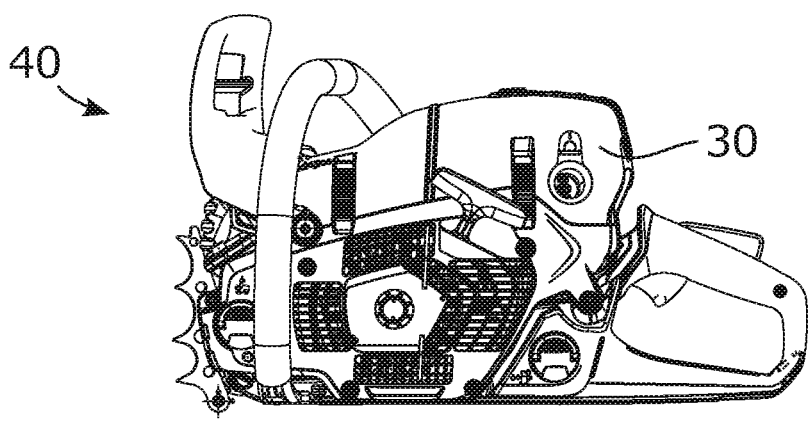
FIG. 4 illustrates a hand-held tool, according to some embodiments.

FIG. 4 illustrates a hand-held tool 40 according to some embodiments. According to the illustrated embodiments, the hand-held tool 40 is a chainsaw. According to further embodiments, the hand-held tool 40 may be another type of portable tool such as a hedge trimmer, a leaf blower, a multi-tool, or the like. The hand-held tool 40 comprises a two-stroke engine 30. The two-stroke engine 30 comprises a piston 1 according to the embodiments illustrated in FIG. 1-FIG. 3.

Figure 5:
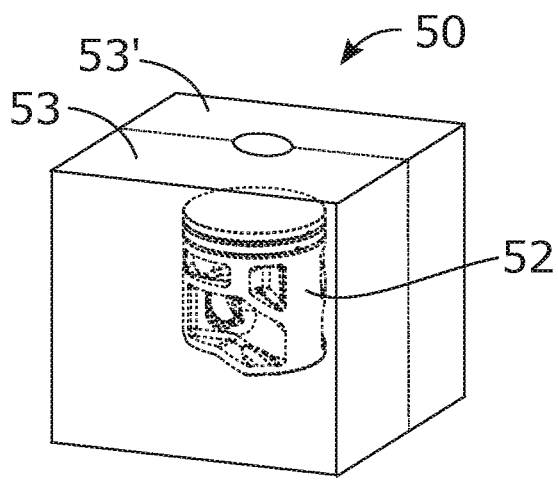
FIG. 5 illustrates a mould, according to some embodiments.

FIG. 5 illustrates a mould 50, according to some embodiments. According to the illustrated embodiments, the mould 50 has a cavity 52 arranged such that a piston casted in the cavity 52 receives a piston top, a mantle surface, and a stratified scavenging channel in the mantle surface. According to the illustrated embodiments, the mould 50 comprises two mould halves 53, 53'. The two mould halves 53, 53' can be separated from each other along a separation plane extending along a centre axis of the cavity 52.

Figure 6:
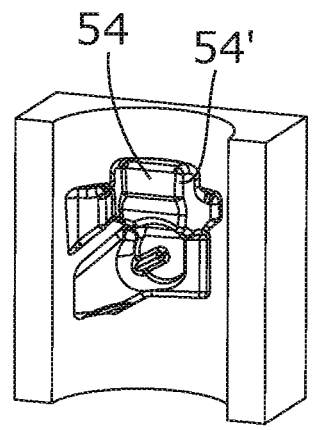
FIG. 6 illustrates a core, according to some embodiments.

FIG. 6 illustrates a core 54, according to some embodiments. As is further explained herein, according to the illustrated embodiments, the core 54 is configured to be arranged in the cavity 52 of the mould 50.

Figure 7:
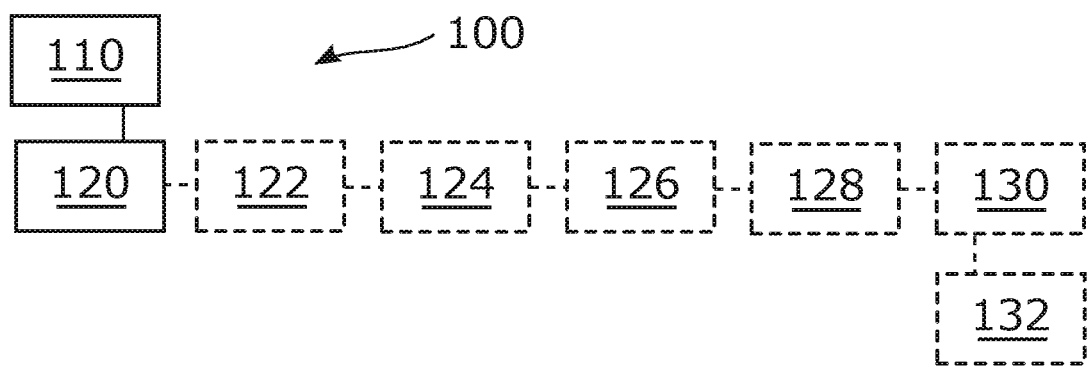
FIG. 7 illustrates a method of manufacturing a two-stroke engine piston, according to some embodiments.

FIG. 7 illustrates a method 100 of manufacturing a two-stroke engine piston 1, according to some embodiments. The piston 1 may be a piston 1 according to the embodiments illustrated in FIG. 1-FIG. 3. Moreover, the mould 50 illustrated in FIG. 5 and the core 54 illustrated in FIG. 6 are referred to in the following. Therefore, below, simultaneous reference is made to FIG. 1-FIG. 3 and FIG. 5-FIG. 7. The method 100 of manufacturing a two-stroke engine piston 1 comprises the steps of:

providing 110 a mould 50 having a cavity 52 arranged such that a piston 1 casted in the cavity 52 receives a piston top 3, a mantle surface 5, and a stratified scavenging channel 7 in the mantle surface 5, and arranging 120 a core 54 in the cavity 52 such that an outer surface 54' of the core 54 defines an inner surface 8 of a weight reduction space 9 of the piston 1, and such that the weight reduction space 9 is arranged between the piston top 3 and the stratified scavenging channel 7 and receives a largest first axial extent a1 at the mantle surface 5 and a second axial extent a2 radially inside the mantle surface 5, wherein the second axial extent a2 is greater than the largest first axial extent a1.

The inner surface 8 of the weight reduction space 9 referred to above is indicated in FIG. 1. The step of arranging 120 the core 54 in the cavity 52 may be performed after the step of providing 110 the mould 50. According to such embodiments, the core 54 may be attached to a delimiting surface of the cavity 52. As an alternative, the steps of providing 110 the mould 50 and arranging 120 the core 54 in the cavity 52 may be performed simultaneously. According to such embodiments, the core 54 may be integrated with the mould 50.

As indicated in FIG. 7, the step 120 of arranging the core 54 may comprise the step of:

arranging 122 the core 54 of a different material than the mould 50.

As an example, the mould 50 may be provided in a metallic material, such as a steel material, and the core 54 may be arranged of a porous material such as sand and/or salt.

As indicated in FIG. 7, the step 120 of arranging the core 54 comprises the step of:

arranging 124 the core 54 such that the core 54 becomes a lost core 54, i.e. a disposable core 54 intended to be used once.

In this manner, a core 54 is obtained being simple to remove after casting a piston 1 in the mould 50, despite the fact that the piston 1 comprises a stratified scavenging channel 7, and despite the fact that the second axial extent a2 of the weight reduction space 9 is greater than the largest first axial extent a1.

As indicated in FIG. 7, the step 120 of arranging the core 54 comprises the step of:

arranging 126 the core 54 of a porous material.

In this manner, a core 54 is obtained being simple to remove after casting a piston 1 in the mould 50, despite the fact that the piston 1 comprises a stratified scavenging channel 7, and despite the fact that the second axial extent a2 of the weight reduction space 9 is greater than the largest first axial extent a1.

As indicated in FIG. 7, the step 126 of arranging the core 54 of a porous material comprises the step of arranging 128 the core 54 of sand and/or salt.

In this manner, a core 54 is obtained being simple to remove after casting a piston 1 in the mould 50, despite the fact that the piston 1 comprises a stratified scavenging channel 7, and despite the fact that the second axial extent a2 of the weight reduction space 9 is greater than the largest first axial extent a1.

As indicated in FIG. 7, the step of arranging 120 the core 54 comprises the step of:

arranging 130 the core 54 using an additive manufacturing method.

According to these embodiments, the core 54 as well as the mould 50 may be provided using the additive manufacturing method.

The step of arranging 130 the core 54 using an additive manufacturing method may comprise the steps of:

successively depositing layers of a material such that the deposited layers of material together form the core 54.

Optionally, the method 100 may comprise:

successively depositing layers of a material such that the deposited layers of material together form the mould 50 and the core 54.

Additive manufacturing is some sometime referred to as 3D printing. The additive manufacturing method, as referred to herein, may be an additive manufacturing method within the category vat photopolymerization, stereolithography, material jetting, binder jetting, powder bed fusion, material extrusion, directed energy deposition, selective laser melting/sintering, or sheet lamination The method 100 as described herein may further comprise the step of:

casting 132 a piston 1 in the cavity 52 of the mould 50.

The piston 1 may for example be casted using an aluminium alloy. Moreover, as an example, the piston 1 may be casted using die casting or gravity casting.

According to some embodiments, method 100 as described herein may further comprise the step of:

machining one or more of the piston top 3, the mantle surface 5, and the stratified scavenging channel 7 after the step of casting 132 the piston 1.

The step of machining may for example comprise one or more of grinding, turning, and milling.

Figure 8:
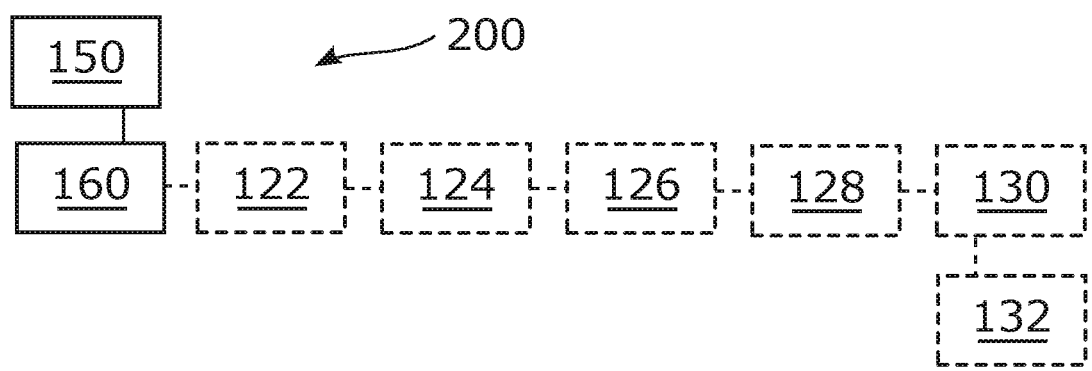
FIG. 8 illustrates a method of manufacturing an engine piston, according to some further embodiments.

FIG. 8 illustrates a method 200 of manufacturing an engine piston 1, according to some further embodiments. The method 200 comprises the steps of:

providing 150 a mould 50 having a cavity 52 arranged such that a piston 1 casted in the cavity 52 receives a piston top 3 and a mantle surface 5, and arranging 160 a core 54 in the cavity 52 such that an outer surface 54' of the core 54 defines an inner surface 8 of a weight reduction space 9 of the piston 1, and such that the weight reduction space 9 receives a largest first axial extent a1 at the mantle surface 5 and a second axial extent a2 radially inside the mantle surface 5, wherein the second axial extent a2 is greater than the largest first axial extent a1.

According to these embodiments, the piston may be another type of engine piston than a two-stroke engine piston 1, such as a four-stroke piston. Such a piston may for example be configured to be used in a compression ignition engine, such as a diesel engine, or an Otto engine with a spark-ignition device, wherein the Otto engine may be configured to run on gas, petrol, alcohol, similar volatile fuels, or combinations thereof.

Moreover, as indicated in FIG. 8, the method 200 may comprise any one of the steps 122, 124, 126, 128, 130, 132 described herein with reference to FIG. 7. Moreover, a piston manufactured by the method 200 may comprise one or more features, functions, and advantages as the piston 1 explained with reference to FIG. 1-FIG. 3.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions or groups thereof.

In embodiments where the piston 1 comprises two or more weight reduction spaces 9, 9', 9'', 9''', "the weight reduction space 9" referred to herein may also be referred to as "the first weight reduction space 9". Therefore, throughout this disclosure the wording "the weight reduction space 9" may be replaced with the wording "the first weight reduction space 9".

The invention claimed is:

1. A two-stroke engine piston comprising:
a piston top,
a mantle surface,
a stratified scavenging channel in the mantle surface, and
a weight reduction space arranged between the piston top and the stratified scavenging channel,
wherein the weight reduction space has:
a first axial extent at the mantle surface;
a second axial extent radially inside the mantle surface;
a first tangential extent at the mantle surface; and
a second tangential extent radially inside the mantle surface,
wherein the second tangential extent is greater than the first tangential extent,
wherein the second axial extent is greater than the first axial extent, and wherein the first tangential extent is greater than the first axial extent.

2. The piston according to claim 1, wherein the second axial extent is at least 10% greater than the first axial extent.

3. The piston according to claim 2, wherein the second axial extent is at least 80% greater than the first axial extent.

4. The piston according to claim 1, wherein the weight reduction space comprises a first uppermost delimiting surface at the mantle surface and a second upper delimiting surface radially inside the mantle surface, and wherein the second upper delimiting surface is arranged closer to the piston top than the first uppermost delimiting surface.

5. The piston according to claim 1, wherein the weight reduction space comprises a first lowermost delimiting surface at the mantle surface and a second lower delimiting surface radially inside the mantle surface, and wherein the second lower delimiting surface is arranged further from the piston top than the first lowermost delimiting surface.

6. The piston according to claim 5, wherein the weight reduction space extends radially inside the stratified scavenging channel.

7. The piston according to claim 1, wherein a radial extent of the weight reduction space is at least 15% of a radius of the piston.

8. The piston according to claim 1, wherein the second tangential extent is at least 5% greater than the first tangential extent.

9. The piston according to claim 1, wherein the weight reduction space is configured to be isolated from interconnecting any gas transferring channels.

10. The piston according to claim 1, wherein the piston comprises:
a second stratified scavenging channel in the mantle surface, and
a second weight reduction space arranged between the piston top and the second stratified scavenging channel.

11. The piston according to claim 10, wherein the weight reduction space is arranged on a first side of a plane extending along a centre axis of the piston, and wherein the second weight reduction space is arranged on a second side of the plane.

12. The piston according to claim 10, wherein the second weight reduction space has a substantially identical but mirrored shape as the weight reduction space.

13. A two-stroke engine comprising the piston according to claim 1.

14. A hand-held tool comprising the two-stroke engine according to claim 13.

15. A two-stroke engine piston comprising:
a piston top;
a mantle surface;
a stratified scavenging channel in the mantle surface; and
a weight reduction space arranged between the piston top and the stratified scavenging channel,
wherein the weight reduction space has a first axial extent at the mantle surface and a second axial extent radially inside the mantle surface,
wherein the second axial extent is greater than the first axial extent,
wherein the piston comprises a first piston ring recess in the mantle surface,
wherein the weight reduction space extends radially inside the first piston ring recess,
wherein the piston comprises a second piston ring recess in the mantle surface, and
wherein the weight reduction space extends radially inside the second piston ring recess.

16. A two-stroke engine piston comprising:
a piston top;
a mantle surface;
a stratified scavenging channel in the mantle surface; and
a weight reduction space arranged between the piston top and the stratified scavenging channel,
wherein the weight reduction space has a first axial extent at the mantle surface and a first tangential extent at the mantle surface,
wherein the first tangential extent is greater than the first axial extent, and
wherein the weight reduction space comprises a first uppermost delimiting surface at the mantle surface and a second upper delimiting surface radially inside the mantle surface, and wherein the second upper delimiting surface is arranged closer to the piston top than the first uppermost delimiting surface.

17. The piston according to claim 16, wherein the weight reduction space comprises a first lowermost delimiting surface at the mantle surface and a second lower delimiting surface radially inside the mantle surface, and wherein the second lower delimiting surface is arranged further from the piston top than the first lowermost delimiting surface.

18. The piston according to claim 17, wherein the weight reduction space extends radially inside the stratified scavenging channel.

19. The piston according to claim 16, wherein the weight reduction space is configured to be isolated from interconnecting any gas transferring channels.

* * * * *